United States Patent Office 3,640,960
Patented Feb. 8, 1972

3,640,960
STABILIZED POLYIMIDAZOPYRROLONES COMPOSITIONS AND METHOD OF PREPARATION
George M. Bower, 2301 Sonny St.,
Pittsburgh, Pa. 15221
No Drawing. Filed May 27, 1969, Ser. No. 828,334
Int. Cl. C08g 20/32, 33/06
U.S. Cl. 260—65   12 Claims

ABSTRACT OF THE DISCLOSURE

By adding a tertiary amine to a reaction mixture used for the preparation of polyimidazopyrrolone compositions, there is made possible the preparation of such compositions with higher solids content and without premature gelation.

BACKGROUND OF THE INVENTION

(1) Field of the invention

This invention relates to the production of polyimidazopyrrolone compositions and to the compositions thus obtained, stabilized against premature gelation by the use of a tertiary amine.

(2) Description of the prior art

It is known how to produce polyimidazopyrrolone compositions. These are customarily made by dissolving in a polar solvent, such as dimethyl formamide, dimethyl acetamide, dimethyl sulfoxide, n-methyl pyrrolidone, or the like, a first reactant such as 3,3′,4,4′-benzophenonetetracarboxylic dianhydride; dissolving in a polar solvent a second reactant such as 3,3′-diaminobenzidine; and adding the first solution to the second slowly with good stirring, with the quantities of the reactants and solvent being so controlled that the reactants are used in stoichiometric proportions and enough solvent is present so that the solids content of the reaction mixture does not surpass 10%. If the reaction mixture has a solids content exceeding 10%, so far as was known prior to the present invention, it was possible to avoid premature gelation of the mixture. The chemical reactions that occur, in the case of the reaction of 3,3′,3,4′-benzophenonetetracarboxylic dianhydride with 3,3′-diaminobenzidine are indicated below.

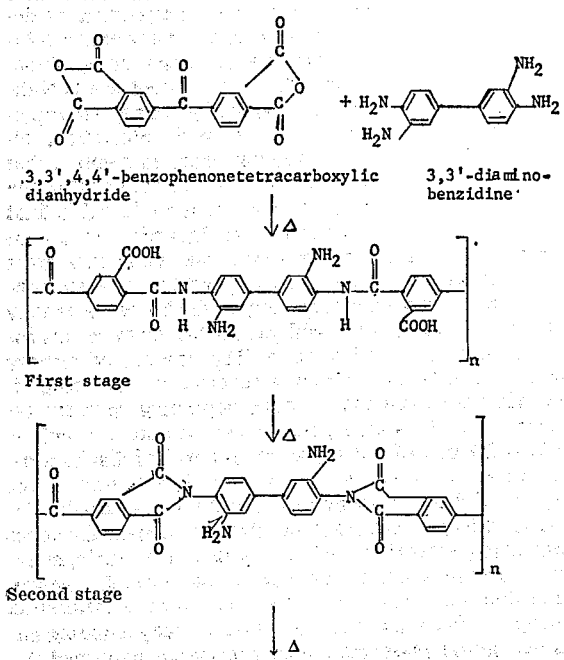

From the above formulae and equations, it will be seen that the first stage of reaction yields a polymer characterized by the linkage

and it is this polymeric material, which though of high molecular weight is soluble in the polar solvent, that is to be stabilized against further reaction by the practice of the present invention. According to the prior art, it was not known how this could be done, with the result that precursor-solutions containing first-stage polymer would in almost all cases gel when exposed to room temperature for 16 hours, even when the solids content of the solution was held to below 10% by weight. It was unknown, moreover, how to obtain the benefits with respect to storage space or shipping weight that would be available if, useful precursor solutions of greater solids content could be prepared.

It is also known that other materials can be used for the starting reactants in place of those mentioned above. In place of the 3,3′,4,4′-benzophenonetetracarboxylic dianhydride there may be used a different dianhydride of aromatic nature, such as pyromellitic dianhydride, 1,4,5,8-naphthalenetetracarboxylic dianhydride, cyclopentadienetetracarboxylic dianhydride, 3,3′,4,4′-diphenyltetracarboxylic dianhydride, 1,2,5,6-naphthalenetetracarboxylicdianhydride, 2,2-bis-(3,4-dicarboxyphenyl)-propane dianhydride, bis-(3,4-dicarboxyphenyl)-ether dianhydride, bis-(3,4-dicarboxyphenyl)-sulfone dianhydride, and the like.

In place of the 3,3′-diaminobenzidine mentioned above, there may naturally also be used different tetra-amines of organic nature that contain two pairs of adjacent (ortho) amino groups, with the pairs being distinct, i.e., such that no amino group from one of the pairs has ortho to it an amino group that forms a part of the other pair. As those skilled in the art will recognize, this rules out 1,2,3,4-tetraaminobenzene but includes 1,2,4,5-tetra-amino-benzene. Other suitable tetra-amines include those that satisfy the formula

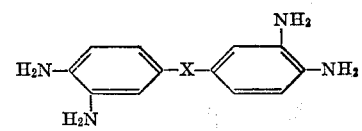

where X is a divalent radical selected from the group consisting of

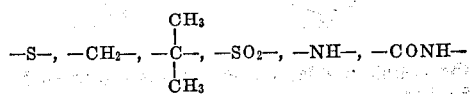

and $-CH_2--CH_2-$;

Various other suitable divalent bridge structures will also suggest themselves to persons skilled in the art, and it will also be appreciated that the aromatic nuclei to which the above-mentioned pairs of ortho amino groups are attached may comprise more than a single benzene ring-two benzene rings or three, alone or with one or more alicyclic or heterocyclic rings of five or six members.

In the preparation of these polyimidazopyrrolone compositions, it is known that difficulty with premature gelatin can be caused by the formation of polyelectrolytes, yielding unwanted cross-linking, as is illustrated by the structural formula

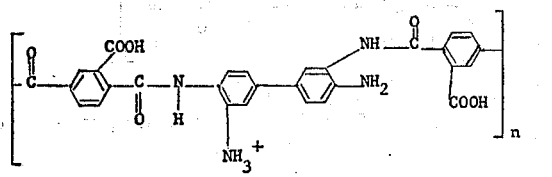

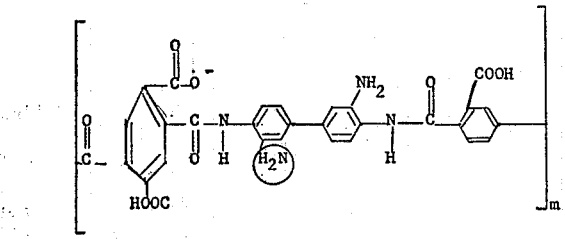

where $n$ and $m$ are integers indicating a degree of polymerization. The circle $H_2N$-group is itself capable of reaction with a carboxyl (COOH) group or unreacted anhydride group to yield another cross-link.

The polyimidazopyrrolones comprises materials that have high strength, high modulus, good heat stability, and good resistance to chemicals. Because of the limited pot life of these compositions (on the order of 16 hours), even when they are carefully and satisfactorily prepared, the polyimidazopyrrolones have been, prior to this invention, of limited usefulness. Uses have been found in the areas of films, laminates, and wire enamels.

SUMMARY OF THE INVENTION

By adding a tertiary amine such as triethylamine or N,N-dimethylaniline to a reaction mixture used for the production of polyimidazopyrrolones, there is obtained a stabilized composition that exhibits very much longer pot life, even when there is used a solids concentration in the reaction mixture higher than 10%. The capability of using solutions higher in solids content has obvious advantages with regard to the shipping weight or the storage space required for the material to complete a given task. With the invention, pot lives as great as 26 days have been observed, in comparison with ones previously known on the order of 16 hours.

DESCRIPTION OF THE PREFERRED EMBODIMENTS

The invention concerns in general the making of polyimidazopyrrolone compositions, i.e., compositions that contain the linkage.

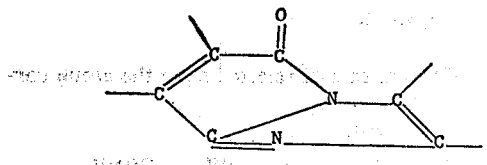

where the double-bonded carbon atoms are in each case parts of a benzene ring. It is usual to make these compositions by reacting an aromatic dianhydride with an aromatic tetramine, each contained in a polar solvent such as dimethyl formamide, with the reactants being used in stoichiometric proportions and in such dilution that the solids content of the reaction mixture does not exceed 10%, since premature gelatin occurs if higher concentrations are attempted or the stirring is inadequate.

To be more precise, the anhydride and the amine react to form a polyimidazopyrrolone-precursor composition that contains polymeric molecules having the repeating unit

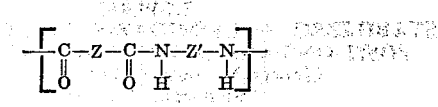

where Z and Z' are each molecule portions that comprise a benzene ring; the molecule portion Z having a first pair of aromatic carbon atoms ortho to each other and a second pair of aromatic carbon atoms ortho to each other, neither of the carbon atoms of the said first pair being ortho to either of the carbon atoms comprising said second pair; one of the carbon atoms of the said first pair being joined as shown to the carbon atom of the formula indicated above and the other of the carbon atoms of said first pair having thereon a carboxyl group; one of the carbon atoms of said second pair being joined as shown to a carbon atom comprising a part of a linkage having the formula indicated above and the other of the carbon atoms comprising said second pair having joined to it a carboxyl group; the molecule portion Z' having a third pair of aromatic carbon atoms ortho to each other and a fourth pair of aromatic carbon atoms ortho to each other, neither of the carbon atoms of the said third pair being ortho to either of the carbon atoms comprising said fourth pair; one of the carbon atoms of said third pair being joined as shown to the nitrogen atom of the formula indicated above and the other of the carbon atoms of said third pair having thereon an amino group; one of the carbon atoms of said fourth pair being joined as shown to a nitrogen atom comprising a part of a linkage having the formula indicated above and the other of the carbon atoms comprising said fourth pair having joined to it an amino group.

In connection with the foregoing, it is to be observed that the dianhydride may have a single benzene ring, like pyromellitic dianhydride, or it may have more than one, like 3,3'-4,4'-benzophenonetetracarboxylic dianhydride; similarly, the tetra-amine may have a single benzene ring, like, 1,2,4,5-tetra-aminobenzene, or more than one, like 3,3'-diaminobenzidine or 3,3',4,4'-tetra-aminodiphenyl ether. Other useful dianhydrides and tetra-amines are taught in the foregoing section, "Description of the Prior Art."

The method of the invention comprises incorporating in a polyimidazopyrrolone-precursor composition as defined above an effective amount of a tertiary amine soluble in the polyimidiazopyrrolone-precursor composition. Among the tertiary amines that can be used are N,N-dimethylaniline, triethylamine, trimethylamine, tripropylamine, N,N-methylethylaniline, N-methylpiperidine, N-ethylpiperidine, and others too numerous to mention that will suggest themselves to persons of ordinary skill in the art. It is convenient if the tertiary amine selected is fluid at room temperature, as is the triethylamine. It is conceivable that certain tertiary amines may be of such great molecular weight as to be relatively inactive or even inoperative, but to my knowledge, any of the known or readily available tertiary amines will yield satisfactory results for the purposes of my invention. The amount of tertiary amine that it takes to obtain a satisfactory stabilizing effect will vary from case to case, depending upon the reactants used. Satisfactory results can be obtained with as little as 0.1 mol of tertiary amine per mol of dianhydride, but in some instances the use of 2.0 mols of tertiary amine per mol of dianhydride or more is indicated, especially if it is desired to produce reaction mixtures wherein the solids content is greater than 10%. It is usually preferable, moreover, to employ tertiary amines of low molecular weight, since they may more easily be removed by volatilization during or after the curing operation, thereby avoiding unwanted initial plasticization or preventing unwanted deplasticization resulting from volatilization of the amine subsequently under service conditions.

In its composition aspect, the present invention relates to a solution in a polar solvent of a polyimidazopyrrolone-precursor composition that contains polymeric molecules having the repeating unit.

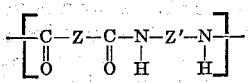

where Z and Z' are each molecule portions that comprise a benzene ring; the molecule portion Z having a first pair of aromatic carbon atoms ortho to each other and a second pair of aromatic carbon atoms ortho to each other, neither of the carbon atoms of the said first pair being ortho to either of the carbon atoms comprising said second pair; one of the carbon atoms of the said first pair being joined as shown to the carbon atom of the formula indicated above and the other of the carbon atoms of said first pair having thereon a carboxyl group; one of the carbon atoms of said second pair being joined as shown to a carbon atom comprising a part of a linkage having the formula indicated above and the other of the carbon atoms comprising said second pair having joined to it a carboxyl group; the molecule portion Z' having a third pair of aromatic carbon atoms ortho to each other and a fourth pair of aromatic carbon atoms ortho to each, neither of the carbon atoms of the said third pair being ortho to either of the carbon atoms comprising said fourth pair; one of the carbon atoms of said third pair being joined as shown to the nitrogen atom of the formula indicated above and the other of the carbon atoms of said third pair having thereon an amino group; one of the carbon atoms of said fourth pair being joined as shown to a nitrogen atom comprising a part of a linkage having the formula indicated above and the other of the carbon atoms comprising said fourth pair having joined to it an amino group, said solution containing an amount, effective to prevent premature gelation of said polyimidazopyrrolone-precursor composition of a tertiary amine.

The tertiary amine is conveniently one selected from the group consisting of N-N-dimethylaniline and triethylamine, though others may be used, as taught above. In one aspect, there are produced compositions of this general kind, with a solids content of about 10% or less and a small addition of tertiary amine, yielding compositions of long pot life (over 2 weeks). In another aspect, there are produced compositions that contain over 10 weight percent of solids and nevertheless do not, because of their tertiary-amine content, gel in less than 20 hours; in some instances, these stabilized, more concentrated compositions resist gelation for more than 1 week.

The invention described above is illustrated by the following specific examples.

EXAMPLE 1

A solution prepared from 10.7 grams (0.050 mol) of 3,3'-diaminobenzidine and 100 grams of dimethyl acetamide is stirred vigorously in a Waring blender. To this solution is added another solution prepared from 16.0 grams (0.0497 mol) of 3,3',4,4'-benzophenonetetracarboxylic dianhydride and 140 grams of dimethyl acetamide. The major portion of the second solution is added to the first over a period of about 15 minutes, and the last few drops of the second solution are added after an interval of five minutes. There is also added to the mixture 1.01 grams (0.010 mol) of triethylamine. There is thus obtained a stabilized polyimidazopyrrolone-precursor composition that has a solids content of about 10%, very low initial viscosity, and good pot life (thin after 20 days, gelled in 26 days). This result is remarkable, considering the results obtained when the same procedure is repeated but with the triethylamine omitted. When that is done, there is obtained a composition with an initial viscosity of 1300 centistokes, gelling in less than 16 hours. The films made by either procedure are sufficiently similar that, for most purposes, one could be substituted for the other.

EXAMPLE 2

Example 1 is repeated, except that there is used a suitably smaller amount of dimethyl acetamide in each case, so as to obtain a reaction solution with a 15.0% solids content, and in place of the 1.01 grams of triethylamine, there is used an addition of 12.1 grams (0.1 mol) of N,N-dimethyl aniline. Despite the high solids content, which is such that the mixture gels almost instantly without the aniline addition, there is obtained a solution with an initial viscosity of 500 centistokes, gelling in 20 hours.

In the following table, further examples are given, with the results of Examples 1 and 2 and a control experiment (no addition, 10% solids) also being included for purposes of comparison. In each case the reactants are the same as in Example 1, and in each case except for Example 2, the tertiary amine used is triethylamine.

TABLE

| | Mole ratio, tert. amine to dianhydride used | Solids content, percent | Initial viscosity, centistokes | Approx. time for gelation, hours |
|---|---|---|---|---|
| Example: | | | | |
| 1 | 0.2 | 10.3 | Low | 624 |
| 2 | 2.0 | 15.0 | 500 | 20 |
| 3 | 1.0 | 10.3 | Low | 624 |
| 4 | 1.0 | 13.7 | 580 | 100 |
| 5 | 1.0 | 15.6 | 4,630 | 20 |
| 6 | 2.0 | 15.2 | 165 | 70 |
| 7 | 2.0 | 16.0 | 700 | 200 |
| Control | 0 | 10.0 | 1,300 | 16 |

The data contained in the foregoing table will demonstrate the remarkable improvement in handling characteristics of compositions of this sort that can be obtained by practicing the invention. The most striking difference is between the performance of the control and that of Example 1. The tendency of the time for gelation to become shorter as the solids content rises appears from Examples 3–5; in this respect, the behavior of Examples 6–7 is unusual and not typical. Example 7 is indicative that a good pot life, exceeding one week, can be obtained with a reaction mixture that contains 16.0 weight percent of solids. The above data also indicate that when the solids content is over 10%, it is usually necessary to use a mol ratio of 1.0 or greater, tertiary amine to dianhydride, to obtain a composition with a satisfactory life, such as 20 hours or more.

The invention described herein was made in the performance of work under a NASA contract and is subject to the provisions of Section 305 of the National Aeronautics and Space Act of 1958, Public Law 85–568 (72 Stat. 435; 42 U.S.C. 2457).

I claim as my invention:

1. A method of stabilizing against premature gelation a polyimidazopyrrolone-precursor composition that contains polymeric molecules having the repeating unit

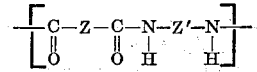

where Z and Z' are each molecule portions that comprise a benzene ring,
  the molecule portion Z having a first pair of aromatic carbon atoms ortho to each other and a second pair of aromatic carbon atoms ortho to each other, neither of the carbon atoms of the said first pair being ortho to either of the carbon atoms comprising said second pair,
  one of the carbon atoms of the said first pair being joined as shown to the carbon atom of the formula indicated above and the other of the carbon atoms of said first pair having thereon a carboxyl group, one of the carbon atoms of said second pair being joined as shown to a carbon atom comprising a part of a linkage having the formula indicated above and the other of the carbon atoms comprising said second pair having joined to it a carboxyl group, the molecule portion Z' having a third pair of aromatic carbon atoms ortho to each other and a fourth pair of aromatic carbon atoms ortho to each other, neither of the carbon atoms of the said third pair being ortho to either of the carbon atoms comprising said fourth pair, one of the carbon atoms of said third pair being joined as shown to the nitrogen atom of the formula indicated above and the other of the carbon atoms of said third pair having thereon an amino group, one of the carbon atoms of said fourth pair being joined as shown to a nitrogen atom comprising a part of a linkage having the formula indicated above and the other of the carbon atoms comprising said fourth pair having joined to it an amino group, said method comprising the step of dissolving in said polyimidazopyrrolone-precursor composition an effective amount of a tertiary amine soluble in said polyimidazopyrrolone-precursor composition.

2. A method as defined in claim 1, characterized in that said polyimidazopyrrolone composition has a solids content greater than 10%.

3. A method as defined in claim 1, characterized in that said tertiary amine is selected from the group consisting of N,N-dimethyl aniline and triethylamine.

4. A method as defined in claim 3, characterized in that said tertiary amine is added to said composition in an amount such that the mol ratio of tertiary amine to dianhydride used is between 0.1 and 2.0.

5. A method as defined in claim 1, characterized in that said tertiary amine is added to said composition in an amount such that the mol ratio of tertiary amine to dianhydride used is between 0.1 and 2.0.

6. A method as defined in claim 5, characterized in that said polymeric molecules having the repeating unit

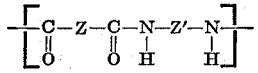

are the result of reaction of 3,3',4,4'-benzophenonetetracarboxylic dianhydride with 3,3'-diaminobenzidine.

7. A composition of matter comprising a solution of a polyimidizopyrrolone-precursor composition that contains polymeric molecules having the repeating unit

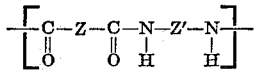

where Z and Z' are each molecule portions that comprise a benzene ring, the molecule portion Z having a first pair of aromatic carbon atoms ortho to each other and a second pair of aromatic carbon atoms ortho to each other, neither of the carbon atoms of the said first pair being ortho to either of the carbon atoms comprising said second pair, one of the carbon atoms of the said first pair being joined as shown to the carbon atom of the formula indicated above and the other of the carbon atoms of said first pair having thereon a carboxyl group, one of the carbon atoms of said second pair being joined as shown to a carbon atom comprising a part of a linkage having the formula indicated above and the other of the carbon atoms comprising said second pair having joined to it a carboxyl group, the molecule portion Z' having a third pair of aromatic carbon atoms ortho to each other and a fourth pair of aromatic carbon atoms ortho to each other, neither of the carbon atoms of said the said third pair being ortho to either of the carbon atoms comprising said fourth pair, one of the carbon atoms of said third pair being joined as shown to the nitrogen atom of the formula indicated above and the other of the carbon atoms of said third pair having thereon an amino group, one of the carbon atoms of said fourth pair being joined as shown to a nitrogen atom comprising a part of a linkage having the formula indicated above and the other of the carbon atoms comprising said fourth pair having joined to it an amino group, said solution further containing an amount, effective to prevent premature gelation of said polyimidazopyrrolone-precursor composition, of a tertiary amine soluble in said polyimidazopyrrolone-precursor composition.

8. A composition of matter as defined in claim 7, characterized in that said tertiary amine is one selected from the group consisting of N,N-dimethyl aniline and triethylamine.

9. A composition as defined in claim 7, characterized in that said solution has a solids content of about 10% or less, and in that said tertiary amine is used in a mol ratio of about 0.1 to 1.0 with respect to the number of mols of dianhydride compound used to make said polymeric molecules.

10. A composition as defined in claim 7, characterized in that said solution has a solids content greater than 10%, and in that said tertiary amine is used in a mol ratio of about 1.0 to 2.0 with respect to the number of mols of dianhydride compound used to make said polymeric molecules.

11. A composition as defined in claim 10, characterized in that said tertiary amine is one selected from the group consisting of N,N-dimethyl aniline and triethylamine.

12. A composition as defined in claim 11, further characterized in that said polymeric molecules having the repeating unit

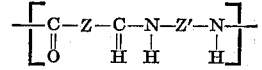

are the result of reaction of 3,3',4,4'-benzophenonetetracarboxylic dianhydride with 3,3'-diaminobenzidine.

References Cited

UNITED STATES PATENTS 3,414,543   12/1968   Paufler _____ 260—47
3,435,004   3/1969    Hathaway et al. _____ 260—65
3,487,051   12/1969   Suzuki et al. _____ 260—78

WILLIAM H. SHORT, Primary Examiner

L. L. LEE, Assistant Examiner

U.S. Cl. X.R.

260—32.6 N, 45.9 R, 47 CP, 78 TF